(12) United States Patent
Millward et al.

(10) Patent No.: US 11,096,452 B2
(45) Date of Patent: Aug. 24, 2021

(54) WEB-ADJUSTMENT CLAMP, SYSTEM AND METHOD

(71) Applicant: Illinois Tool Works Inc., Glenview, IL (US)

(72) Inventors: Eric William Millward, Evanston, IL (US); Steven Craig Keller, Island Lake, IL (US); Scott David Kolasa, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/426,598

(22) Filed: May 30, 2019

(65) Prior Publication Data

US 2019/0387844 A1 Dec. 26, 2019

Related U.S. Application Data

(60) Provisional application No. 62/689,477, filed on Jun. 25, 2018.

(51) Int. Cl.
*A44B 11/06* (2006.01)
*F16B 2/18* (2006.01)

(52) U.S. Cl.
CPC .............. *A44B 11/06* (2013.01); *F16B 2/185* (2013.01)

(58) Field of Classification Search
CPC ......... A44B 11/06; A44B 11/12; F16B 2/185; F16B 2/18
See application file for complete search history.

(56) References Cited

U.S. PATENT DOCUMENTS

| 330,213 | A | * | 11/1885 | Deweese | A01K 1/04 54/34 |
| 2,442,266 | A | * | 5/1948 | Davis | B64D 9/00 410/96 |
| 4,891,866 | A | * | 1/1990 | Kasai | A44B 11/12 24/170 |
| 5,621,953 | A | * | 4/1997 | Fildan | A44B 11/12 24/170 |
| 5,661,877 | A | * | 9/1997 | Bloomer | A44B 11/12 24/170 |

(Continued)

FOREIGN PATENT DOCUMENTS

| DE | 3504142 A1 | * | 8/1986 | ............. A44B 11/06 |
| FR | 2556421 A1 | * | 6/1985 | ............. F16G 11/12 |
| GB | 2168104 | * | 6/1986 | ............. A44B 11/12 |

*Primary Examiner* — Robert Sandy
*Assistant Examiner* — Louis A Mercado
(74) *Attorney, Agent, or Firm* — Quarles & Brady LLP

(57) ABSTRACT

A web-adjustment clamp includes a main body including a first lateral channel, a second lateral channel, a fold channel, and an exit channel. The first lateral channel, the second lateral channel, the fold channel, and the exit channel are configured to accept, have passed through, and retain a first webbing. The fold channel may be further configured to accept, have passed through, and retain a second webbing. In at least one embodiment, a locking door is pivotally coupled to the main body. The locking door is configured to be moved between an open position and a closed position. The first webbing is adjustable in relation to the web-adjustment clamp when the locking door is in the open position, and locked in place when the locking door is in the closed position.

22 Claims, 5 Drawing Sheets

(56) References Cited

U.S. PATENT DOCUMENTS

| | | | | |
|---|---|---|---|---|
| 5,832,569 A * | 11/1998 | Berg | ............ | A44B 11/12 |
| | | | | 24/170 |
| 6,295,700 B1 * | 10/2001 | Plzak | ............ | A44B 11/12 |
| | | | | 24/134 R |
| 6,381,810 B2 * | 5/2002 | Hsieh | ............ | A44B 11/06 |
| | | | | 24/170 |
| 6,667,441 B2 * | 12/2003 | Steinhauer | ............ | B60R 16/027 |
| | | | | 174/117 F |
| 6,735,826 B2 * | 5/2004 | Uehara | ............ | A44B 11/12 |
| | | | | 24/170 |
| 7,404,239 B1 * | 7/2008 | Walton | ............ | A44B 11/12 |
| | | | | 24/170 |
| 8,522,728 B2 * | 9/2013 | Davis, Jr. | ............ | A01K 27/001 |
| | | | | 119/863 |
| 8,635,746 B2 * | 1/2014 | Bellamy | ............ | A61B 17/1327 |
| | | | | 24/170 |
| 8,732,915 B2 | 5/2014 | Kolasa | | |
| 8,935,833 B2 * | 1/2015 | Kaneko | ............ | A44B 11/065 |
| | | | | 24/170 |
| 9,375,055 B2 * | 6/2016 | Tedder | ............ | A41F 15/002 |
| 2007/0017070 A1 * | 1/2007 | Kato | ............ | A44B 11/12 |
| | | | | 24/170 |
| 2007/0193004 A1 * | 8/2007 | Chou | ............ | A44B 11/006 |
| | | | | 24/170 |

\* cited by examiner

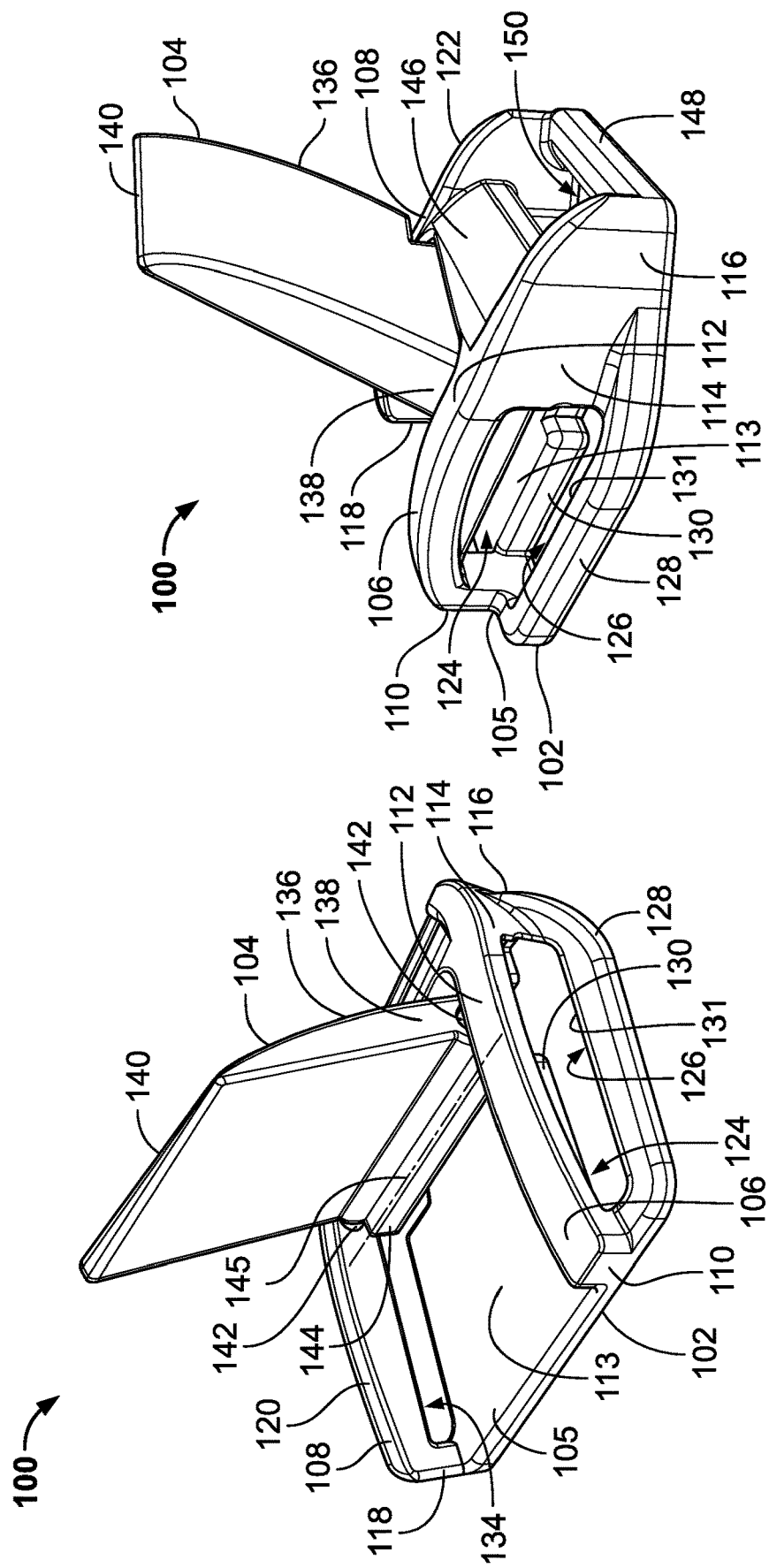

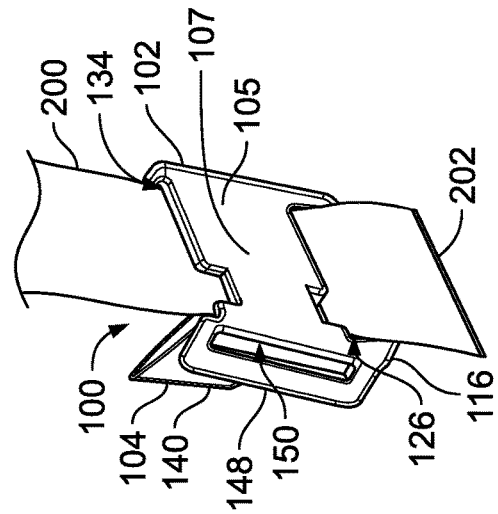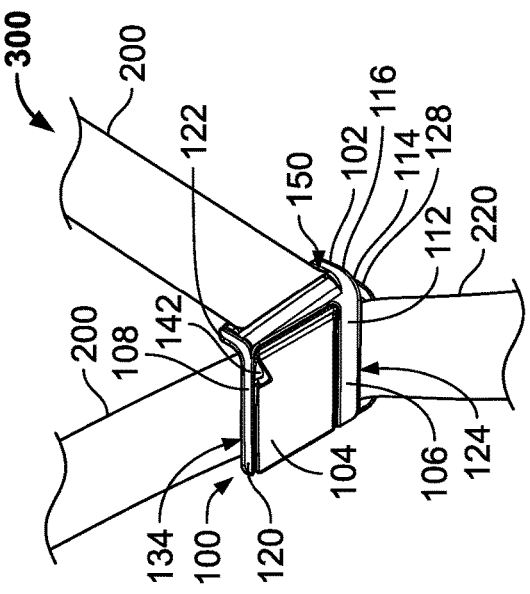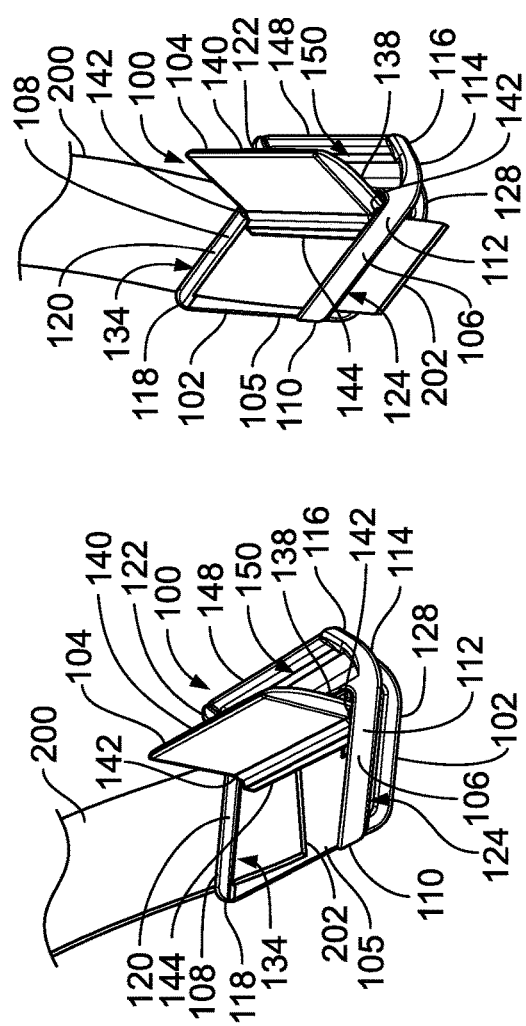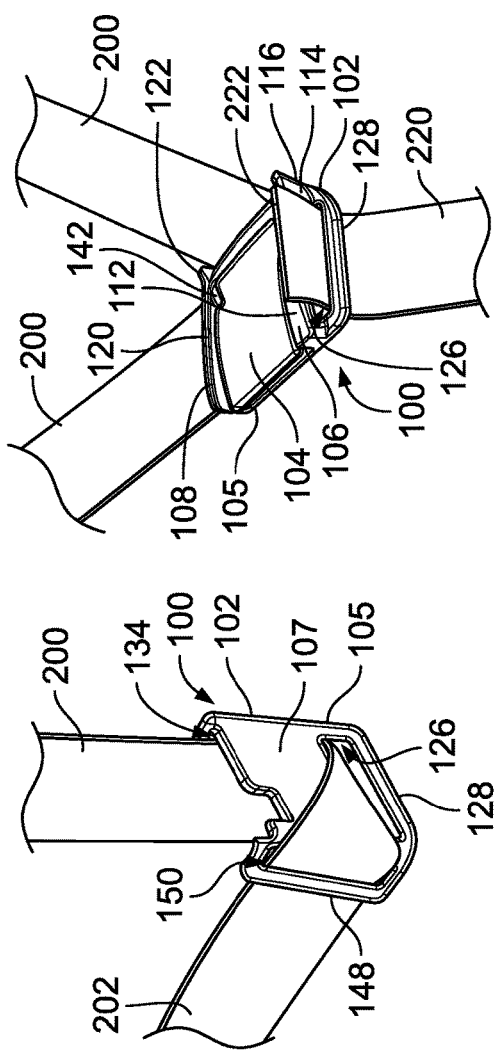

WEB-ADJUSTMENT CLAMP, SYSTEM AND METHOD

RELATED APPLICATION

This application is based on, claims priority to, and incorporates herein by reference in its entirety U.S. Provisional Application No. 62/689,477, filed on Jun. 25, 2018, and entitled "Web-Adjustment Clamp, System and Method".

FIELD OF EMBODIMENTS OF THE DISCLOSURE

Embodiments of the present disclosure generally relate to web-adjustment clamps, such as may be used with respect to straps or other such webbing of helmets, backpacks, clothing, and the like.

BACKGROUND

Various components include webbing (such as straps, strings, or the like). For example, helmets, backpacks, and certain items of clothing may include adjustable webbing.

Clamps may be used to adjust and secure the webbing in a desired position. Certain clamps are configured to slidably engage portions of webbing, and selectively lock down relative to the webbing. Certain known webbing clamps typically include a base frame that is configured to receive portions of the webbing such that the base frame may slide along and adjust webbing segments by being selectively pulled through the base frame. Certain known webbing clamps include lock-down elements in the form of camming doors that are held within a carrier frame and overlay the webbing segments.

Various known webbing clamps may be bulky and large. Further, various known webbing clamps are susceptible to allowing webbing to twist, pucker, or the like. Also, various known webbing clamps preclude quick and easy strap adjustment. Moreover, the various known webbing clamps typically do not lock onto the webbing, thereby allowing the webbing to undesirably move. Additionally, certain known webbing clamps that include a cam that locks perpendicular to the webbing may become unlocked when the webbing is pulled in a particular direction.

SUMMARY OF EMBODIMENTS OF THE DISCLOSURE

A need exists for a web-adjustment clamp that is smaller and more compact than various known webbing clamps. A need also exists for a web-adjustment clamp that prevents, minimizes, or reduces twisting, puckering, and/or the like of webbing. Also, a need exists for a web-adjustment clamp that allows for quick and easy adjustment of webbing (such as a strap, rope, string, or other such webbing). Further, a need exists for a web-adjustment clamp that securely locks onto webbing. Also, a need exists for a web-adjustment clamp that prevents, minimizes, or otherwise reduces inadvertent unlocking of the webbing.

With those needs in mind, certain embodiments of the present disclosure provide a web-adjustment clamp that includes a main body including a first lateral channel, a second lateral channel, a fold channel, and an exit channel. The first lateral channel, the second lateral channel, the fold channel, and the exit channel are configured to accept, have passed through, and retain a first webbing. The fold channel may be further configured to accept, have passed through, and retain a second webbing.

Certain embodiments of the present disclosure provide a web-adjustment clamp that includes a main body including a first lateral channel, a second lateral channel, a fold channel, and an exit channel. A first webbing is configured to pass through and be retained within the first lateral channel, the second lateral channel, the fold channel, and the exit channel. A second webbing is configured to pass through and be retained within the fold channel.

In at least one embodiment, a locking door is pivotally coupled to the main body. The locking door is configured to be moved between an open position and a closed position. The first webbing is adjustable in relation to the web-adjustment clamp when the locking door is in the open position, and locked in place when the locking door is in the closed position.

The locking door may include a locking ledge that is configured to engage a portion of the first webbing when the locking door is in the closed position. The locking door may have a longitudinal axis that is parallel to a portion of the first webbing that extends between the first lateral channel and the second lateral channel.

The first lateral channel may be defined between a first lateral beam and a surface plane of a base of the main body. The second lateral channel may be defined between a second lateral beam and the surface plane of the base.

The fold channel may be formed through a base of the main body underneath the first lateral beam or the second lateral beam. The fold channel may be axially aligned with the first lateral channel and the second lateral channel.

The main body may include an outboard beam that is coplanar with a base. The fold channel may be bounded by a first interior edge of the base and a second interior edge of the outboard beam.

In at least one embodiment, the exit channel is canted in relation to one or more of the first lateral channel, the second lateral channel, and the fold channel.

The first lateral channel or the second lateral channel provides an entry slot that is configured to receive a free end of the first webbing. The other of the first lateral channel or the second lateral channel provides a retaining slot.

A portion of the first webbing is configured to be retained between the first lateral channel and the second lateral channel. A free end of the first webbing is configured to be folded through the fold slot while a portion of the first webbing is retained between the first lateral channel and the second lateral channel.

Certain embodiments of the present disclosure provide a web-adjustment system that includes a first webbing and a web-adjustment clamp. The web-adjustment clamp comprises a main body that includes a first lateral channel, a second lateral channel, a fold channel, and an exit channel. The first webbing passes through and is retained within the first lateral channel, the second lateral channel, the fold channel, and the exit channel. A second webbing may also pass through and be retained within the fold channel. In at least one embodiment, a locking door is pivotally coupled to the main body. The locking door is configured to be moved between an open position and a closed position. The first webbing is adjustable in relation to the web-adjustment clamp when the locking door is in the open position, and locked in place when the locking door is in the closed position.

BRIEF DESCRIPTION OF SEVERAL VIEWS OF THE DRAWINGS

FIG. 1 illustrates a perspective front lateral view of a web-adjustment clamp, according to an embodiment of the present disclosure.

FIG. 2 illustrates a perspective rear lateral view of the web-adjustment clamp.

FIG. 7 illustrates a perspective top view of a first webbing inserted into an entry slot of the web-adjustment clamp, according to an embodiment of the present disclosure.

FIG. 8 illustrates a perspective top view of the first webbing passing through the entry slot and a retaining slot of the web-adjustment clamp.

FIG. 9 illustrates a perspective bottom view of the first webbing passing through the entry slot and the retaining slot of the web-adjustment clamp.

FIG. 10 illustrates a bottom view of the first webbing passing through the entry slot and the retaining slot and folded into an exit channel of the web-adjustment clamp, according to an embodiment of the present disclosure.

FIG. 11 illustrates a perspective top view of the first webbing secured to the web-adjustment clamp, and a second webbing passing into a fold slot of the web-adjustment clamp, according to an embodiment of the present disclosure.

FIG. 12 illustrates a top view of the first webbing and the second webbing secured to the web-adjustment clamp.

Figure 3:
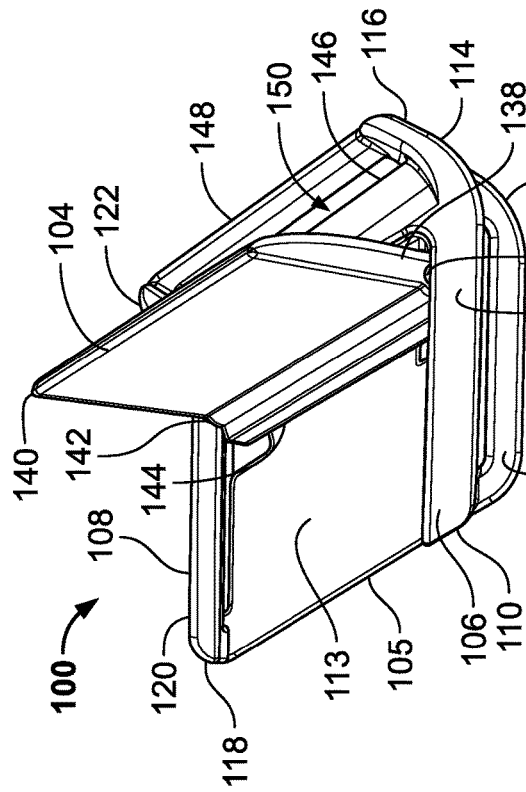
FIG. 3 illustrates a top view of the web-adjustment clamp with a locking door in a closed position, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

As explained herein, embodiments of the present disclosure provide a web-adjustment clamp that is configured to allow for efficient adjustment of webbing, such as straps, strings, ropes, and/or the like.

U.S. Pat. No. 8,732,915, entitled "Strap Clamp With Transverse Oriented Cam Door," which is hereby incorporated by reference in its entirety, discloses a webbing clamp that includes a hollow base frame that is configured to receive elongated webbing segments in threaded relation through a pair of opposing slot openings and a hinging camming door structure rotatably mounted within the base frame about an axis of rotation.

FIG. 1 illustrates a perspective front lateral view of a web-adjustment clamp 100, according to an embodiment of the present disclosure. The web-adjustment clamp 100 includes a main body 102 and a locking door 104 pivotally coupled to main body 102. The main body 102 includes a flat, planar base 105 and a first lateral beam 106 extending from the base 105, and a second lateral beam 108 opposite from the first lateral beam 106 that also extends from the base 105. The first lateral beam 106 includes an upstanding front post 110 that spaces a perpendicular extension bar 112 over a surface plane 113 of the base 105. The extension bar 112 connects to a rear bracket 114 that connects to a rear end 116 of the base 105. Similarly, the second lateral beam 108 includes an upstanding front post 118 that spaces a perpendicular extension bar 120 over the surface plane 113 of the base 105. The extension bar 120 connects to a rear bracket 122 (shown in FIG. 2) that connects to the rear end 116 of the base 105.

A first lateral channel 124 is defined between the first lateral beam 106 and the surface plane 113 of the base 105. The first lateral channel 124 provides a retaining slot. A fold channel 126 is formed through the base 105 underneath at least a portion of the extension bar 112 of the first lateral beam 106. The fold channel 126 provides a fold slot. The fold channel 126 connects to the first lateral channel 124. That is, an open space is formed by the first lateral channel 124 and the fold channel 126. The fold channel 126 may be in axial alignment (for example, parallel) to the first lateral channel 124 and a second lateral channel 134.

An outboard beam 128 outwardly extends from the base 105. For example, the outboard beam 128 outwardly extends from the front post 110 and the rear bracket 114. The outboard beam 128 may be coplanar with the base 105. The fold channel 126 is bounded by an interior edge 130 of the base 105 and an interior edge 131 of the outboard beam 128.

The second lateral channel 134 is defined between the second lateral beam 108 and the surface plane 113 of the base 105. The second lateral channel 134 is opposite from the first lateral channel 124. The second lateral channel 134 provides an entry slot.

The locking door 104 includes a panel 136 having a coupling base 138 that connects to a tapered distal edge 140. The coupling base 138 pivotally couples the locking door 104 to interior surfaces of the first lateral beam 106 and the second lateral beam 108 such as through cylindrical posts 142 that are pivotally retained within reciprocal channels. A locking ledge 144 extends downwardly from a lower surface of the coupling base 138. The locking ledge 144 extends towards base 105 when the locking door 104 is in a closed position. As shown in FIG. 1, the locking door 104 is in an open position. The locking ledge 144 may be a column or beam having flat, smooth surfaces. In at least one other embodiment, the locking ledge 144 may include teeth or other such protuberances that are configured to engage webbing.

FIG. 2 illustrates a perspective rear lateral view of the web-adjustment clamp 100. As shown, the rear bracket 114 and a rear portion of the outboard beam 128 may cant or otherwise shift towards and connect to the rear end 116 of the base 105.

A cross wall 146 extends between the opposed rear brackets 114 and 122 behind the pivotal interfaces between the locking door 104 and the first lateral beam 106 and the second lateral beam 108. The base 105 further includes a rear cross beam 148 that connects to lower terminal portions of the rear brackets 114 and 122. An exit channel 150 may be formed through the base 105 inboard from the rear cross beam 148, and may be canted in relation to the first lateral channel 124, the second lateral channel 134, and the fold channel 126. That is, the exit channel 150 may not be longitudinally aligned with the fold channel 126. For example, a longitudinal axis of the exit channel 150 may be angled in relation to a longitudinal axis of the fold channel 126.

Referring to FIGS. 1 and 2, the web-adjustment clamp 100 includes the main body 102, which includes the first lateral channel 124, the second lateral channel 134, the fold channel 126 formed through the base 105, and the exit channel 150 formed through the base 105. A first or upper webbing is configured to pass through the first lateral channel 124, the second lateral channel 134, the fold channel 126, and the exit channel 150. A second or lower webbing is configured to pass through the fold channel 126. The locking door 104 is pivotally coupled to the main body 102. The locking door 104 is configured to be moved between an open position and a closed position. The first webbing is adjustable in relation to the web-adjustment clamp 100 when the locking door 104 is in the open position. The first webbing is locked in place when the locking door 104 is in the closed position.

Figure 5:
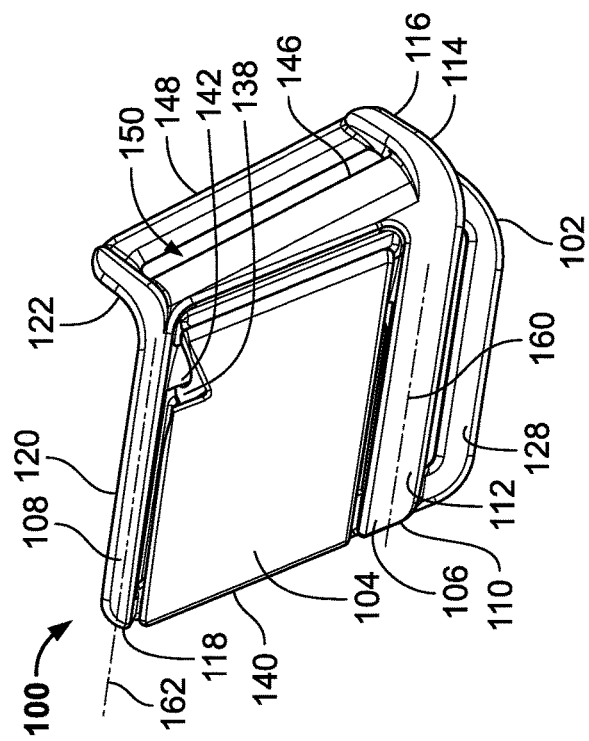
FIG. 5 illustrates a perspective top view of the web-adjustment clamp with the locking door in an open position.
Figure 4:
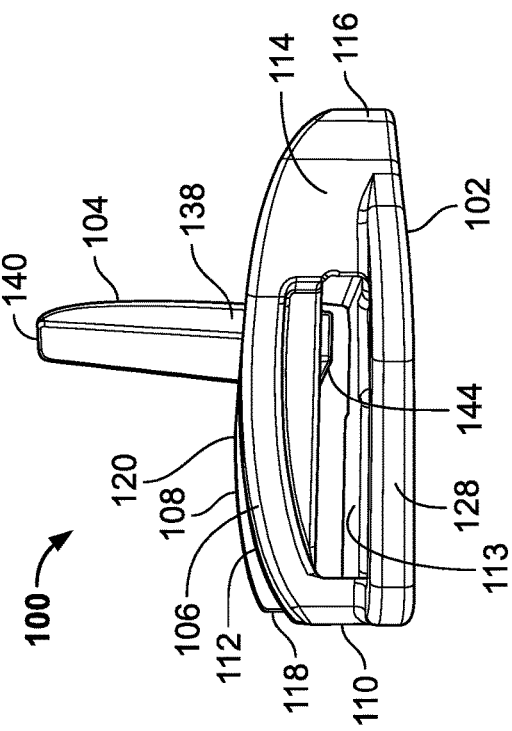
FIG. 4 illustrates a lateral view of the web-adjustment clamp with the locking door in the closed position.
Figure 6:
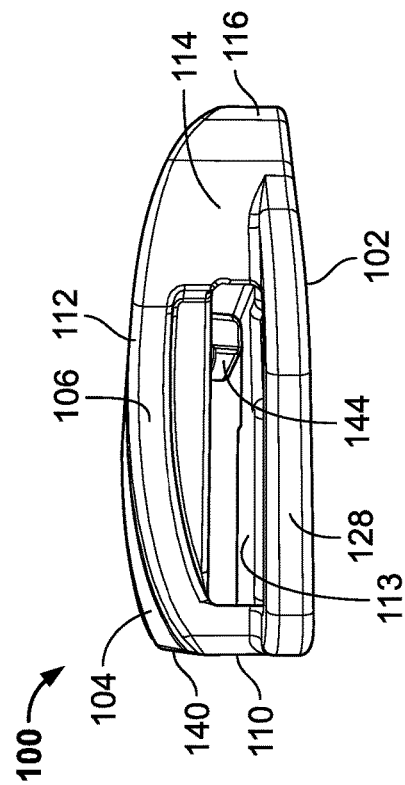
FIG. 6 illustrates a lateral view of the web-adjustment clamp with the locking door in the open position.

FIG. 3 illustrates a top view of the web-adjustment clamp 100 with the locking door 104 in a closed position, according to an embodiment of the present disclosure. FIG. 4 illustrates a lateral view of the web-adjustment clamp 100 with the locking door 104 in the closed position. FIG. 5 illustrates a perspective top view of the web-adjustment clamp 100 with the locking door 104 in an open position. FIG. 6 illustrates a lateral view of the web-adjustment clamp 100 with the locking door 104 in the open position. Referring to FIGS. 3-6, the cross wall 146 and the rear cross beam 148 may be canted in relation to longitudinal axes 160 and 162 of the extension bars 112 and 120 by the aligned and angled rear brackets 114 and 122.

FIG. 7 illustrates a perspective top view of a first webbing 200 inserted into an entry slot defined by the second lateral channel 134 of the web-adjustment clamp 100, according to an embodiment of the present disclosure. Referring to FIGS. 1-7, in order to secure the first webbing 200 to the web-adjustment clamp 100, the locking door 104 is opened, and a free end 202 of the first webbing 200 is fed through the second lateral channel 134 over the base 105 towards the first lateral channel 124.

FIG. 8 illustrates a perspective top view of the first webbing 200 passing through the entry slot defined by the second lateral channel 134 and a retaining slot defined by the first lateral channel 124 of the web-adjustment clamp 100. Referring to FIGS. 1-8, the free end 202 of the first webbing 200 is fed into and through the first lateral channel 124.

FIG. 9 illustrates a perspective bottom view of the first webbing 200 passing through the entry slot and the retaining slot of the web-adjustment clamp 100. Referring to FIGS. 1-9, the free end 202 is pulled through the first lateral channel 124 and a fold slot defined by the fold channel 126. The free end 202 is exposed through the fold slot defined by the fold channel 126.

FIG. 10 illustrates a bottom view of the first webbing 200 passing through the entry slot and the retaining slot and folded into an exit channel 150 of the web-adjustment clamp 100, according to an embodiment of the present disclosure. Referring to FIGS. 1-10, after the free end 202 is pulled through the first lateral channel 124, the free end 202 is folded and passed through the exit channel 150. The canted orientation of the exit channel 150 allows for the free end 202 to easily fold flat over a lower surface 107 of the base 105 and into the exit channel 150. The free end 202 is then pulled a desired distance through the web-adjustment clamp 100. At the desired position, the locking door 104 is then pivoted into the closed position. In the closed position, the locking ledge 144 compressively sandwiches a portion of the first webbing 200 into the base 105, thereby locking the first webbing 200 in place.

FIG. 11 illustrates a perspective top view of the first webbing secured 200 to the web-adjustment clamp 100, and a second webbing 220 passing into a fold slot defined by the fold channel 126 of the web-adjustment clamp 100, according to an embodiment of the present disclosure. Referring to FIGS. 1-6 and 11, a free end 222 of the second webbing 220 is passed into and through the fold channel 126. The free end 222 may then be pulled a desired distance through the fold channel 126, and the second webbing 220 may be folded over the outboard beam 128.

The locking door 104 may be in the open position or the closed position as the second webbing 220 is fed through the fold channel 126. Also, optionally, the second webbing 220 may be fed through the fold channel 126 before the first webbing 200 is connected to the web-adjustment clamp 100.

Figure 13:
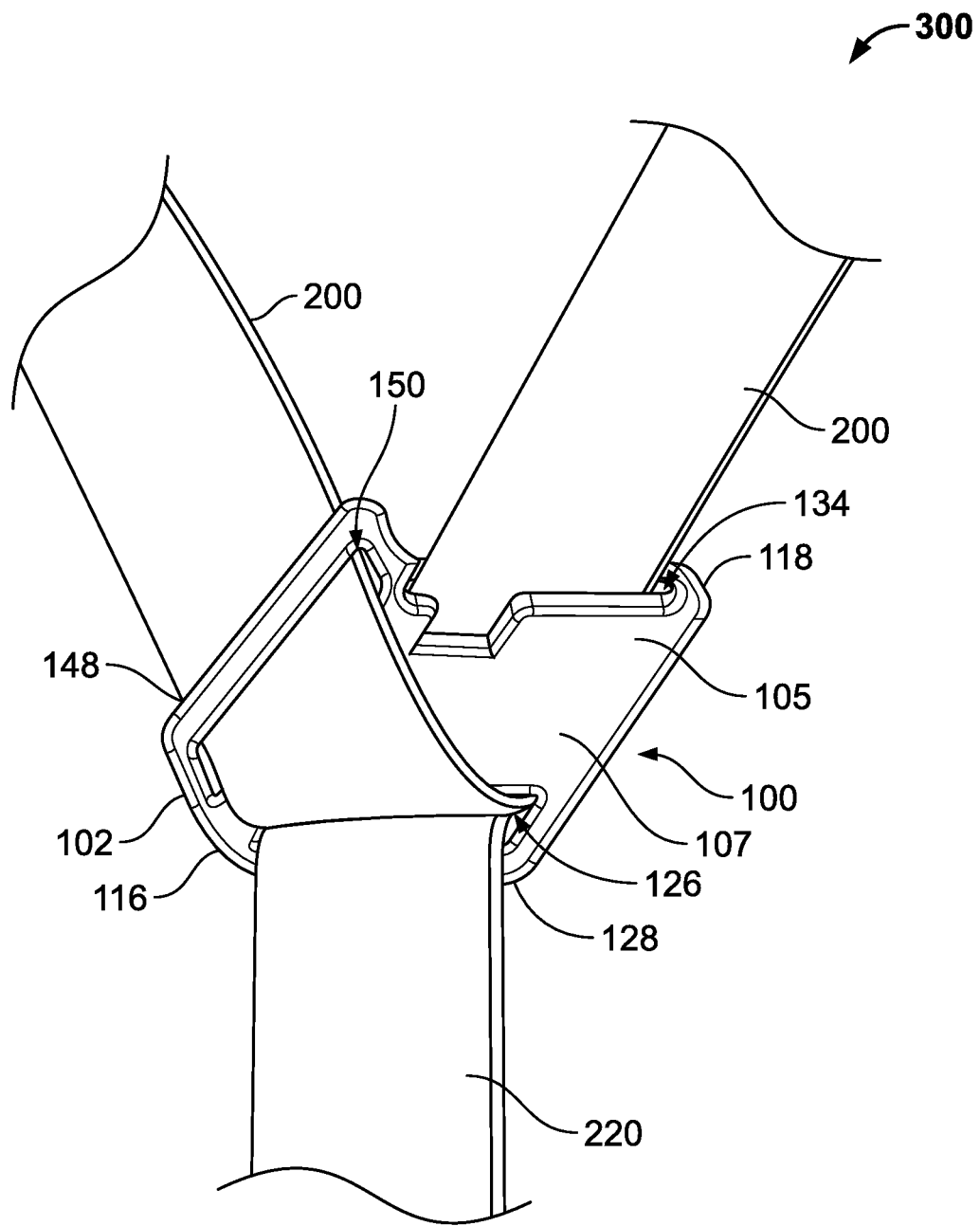
FIG. 13 illustrates a bottom view of the first webbing and the second webbing secured to the web-adjustment clamp.

FIG. 12 illustrates a top of the first webbing 200 and the second webbing 220 secured to the web-adjustment clamp 100. FIG. 13 illustrates a bottom view of the first webbing 200 and the second webbing 220 secured to the web-adjustment clamp 100. Referring to FIGS. 12 and 13, a web-adjustment system 300 includes the web-adjustment clamp 100, the first webbing 200, and the second webbing 220. The second webbing 220 is folded over the outboard beam 128 and coupled to a component (not shown in FIG. 12).

Referring to FIGS. 1-13, the first webbing 200 is adjustably secured to the web-adjustment clamp 100 through the entry slot defined by the second lateral channel 134, the retaining slot defined by the first lateral channel 124, and folded into the exit channel 150. A portion of the first webbing 200 is exposed and passes through the fold slot defined by the fold channel 126. The second webbing 220 passes through the fold slot defined by the fold channel 126 over the outboard beam 128. That is, portions of both the first webbing 200 and the second webbing 220 pass through the fold channel 126. The first webbing 200 may provide an upper webbing that couples to a helmet, while the second webbing 220 may provide a lower webbing that provides or otherwise couples to a chin strap.

The locking ledge 144 of the locking door 104 has a longitudinal axis 145 (shown in FIG. 1) that is parallel to a portion of the first webbing 200 that extends between the first lateral channel 124 (that is, the entry slot) and the second lateral channel 134 (that is, the retaining slot). As such, the locking ledge 144 runs parallel to the portion of the first webbing 200 that the locking ledge 144 directly engages.

The web-adjustment clamp 100 allows for one time lacing of the first webbing 200 and the second webbing 220 thereto. As described herein, with the locking door 104 open, the first (or upper) webbing 200 is fed through the entry slot defined by the second lateral channel 134, then fed through the retaining slot defined by the first lateral channel 124, folded through the fold slot defined by the fold channel 126, and fed through an exit slot defined by the exit channel 150. The second (or lower) webbing 220 is also fed through of the fold slot defined by the fold channel 126. In this manner, the first webbing 200 and the second webbing 220 may be quickly and easily secured to the web-adjustment clamp 100.

An individual may pivot the locking door 104 into the open position. In the open position, the locking ledge 144 disengages from the portion of the first webbing 200 between the first lateral channel 124 and the second lateral channel 134, thereby allowing the individual to adjust the first webbing 200 in relation to the web-adjustment clamp 100. When the locking door 104 is in the open position, the first webbing 200 may be slidably adjusted in relation to the web-adjustment clamp 100 until a desired fit is achieved. At the desired position, the locking door 104 is then pivoted into the closed position, thereby locking the first webbing 200 in place.

The web-adjustment clamp 100 ensures that the webbing 200 and 220 lays flat, thereby preventing or otherwise reducing puckering or twisting. The orientation of the locking ledge 144 in relation to the webbing 200 prevents or otherwise reduces undesired disengagement with the webbing 200. The web-adjustment clamp 100 allows for quick and easy adjustment of the webbing 200 without manually feeding webbing into and through the web-adjustment clamp 100.

Figure 14:
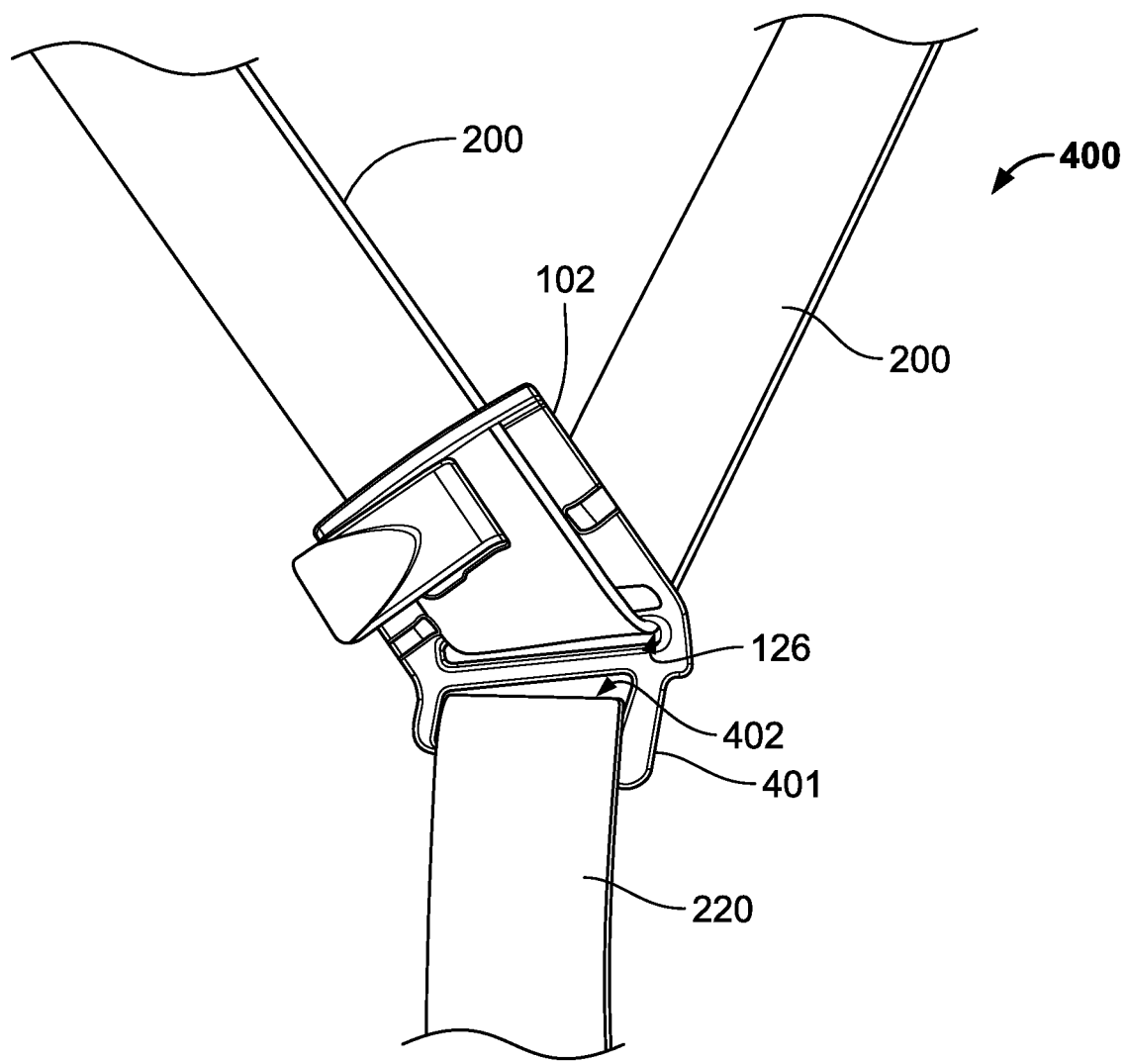
FIG. 14 illustrates a bottom view of the first webbing and the second webbing secured to a web-adjustment clamp, according to an embodiment of the present disclosure.

FIG. 14 illustrates a bottom view of the first webbing 200 and the second webbing 220 secured to a web-adjustment clamp 400, according to an embodiment of the present disclosure. In this embodiment, the web-adjustment clamp 400 may include an additional bar 401 that defines an additional loop channel 402 separated from the fold channel 126. Instead of being looped through the fold channel 126, the second webbing 220 may loop through the loop channel 402.

The web-adjustment clamp 100, 400 may be used with various components having webbing. For example, the web-adjustment clamp 100, 400 may be used with various helmets (such as bicycle helmets, climbing helmets, ice hockey helmets, and/or the like), backpacks, various items of clothing, and/or the like.

As described herein, embodiments of the present disclosure provide a web-adjustment clamp 100, 400 that is smaller and more compact than various known webbing clamps. The web-adjustment clamp 100, 400 prevents, minimizes, or reduces twisting, puckering, and/or the like of webbing. The web-adjustment clamp 100, 400 allows for quick and easy adjustment of webbing (such as a strap, rope, string, or other such webbing). Further, the web-adjustment clamp 100, 400 securely locks onto webbing. Also, the web-adjustment clamp 100, 400 prevents, minimizes, or otherwise reduces inadvertent unlocking of the webbing.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A web-adjustment clamp, comprising:
a main body including a first lateral channel, a second lateral channel, a fold channel, and an exit channel, the first lateral channel, the second lateral channel, the fold channel, and the exit channel being configured to accept, have passed through, and retain a first webbing, wherein a longitudinal axis of the exit channel is non-parallel with a longitudinal axis of the fold channel, and wherein the fold channel is axially aligned with the first lateral channel and the second lateral channel.

2. The web-adjustment clamp of claim 1, the fold channel being further configured to accept, have passed through, and retain a second webbing.

3. The web-adjustment clamp of claim 1, further comprising a locking door that is pivotally coupled to the main body, wherein the locking door is configured to be moved between an open position and a closed position, wherein the first webbing is adjustable in relation to the web-adjustment clamp when the locking door is in the open position, and wherein the first webbing is locked in place when the locking door is in the closed position.

4. The web-adjustment clamp of claim 3, wherein the locking door comprises a locking ledge that is configured to engage a portion of the first webbing when the locking door is in the closed position.

5. The web-adjustment clamp of claim 4, wherein the locking ledge of the locking door has a longitudinal axis that is parallel to the portion of the first webbing that extends between the first lateral channel and the second lateral channel.

6. The web-adjustment clamp of claim 1, wherein the first lateral channel is defined between a first lateral beam and a surface plane of a base of the main body, and wherein the second lateral channel is defined between a second lateral beam and the surface plane of the base.

7. The web-adjustment clamp of claim 1, wherein the fold channel is formed through a base of the main body underneath one of a first lateral beam or a second lateral beam.

8. The web-adjustment clamp of claim 1, wherein the main body comprises an outboard beam that is coplanar with a base, and wherein the fold channel is bounded by a first interior edge of the base and a second interior edge of the outboard beam.

9. The web-adjustment clamp of claim 1, wherein one of the first lateral channel or the second lateral channel provides an entry slot that is configured to receive a free end of the first webbing, and wherein the other of the first lateral channel or the second lateral channel provides a retaining slot.

10. The web-adjustment clamp of claim 9, wherein a free end of the first webbing is configured to be folded through the fold channel while a portion of the first webbing is retained between the first lateral channel and the second lateral channel.

11. The web-adjustment clamp of claim 1, wherein a portion of the first webbing is configured to be retained between the first lateral channel and the second lateral channel.

12. A web-adjustment system comprising:
a first webbing; and
a web-adjustment clamp, comprising:
    a main body including a first lateral channel, a second lateral channel, a fold channel, and an exit channel, wherein the first webbing passes through and is retained within the first lateral channel, the second lateral channel, the fold channel, and the exit channel; and
    a locking door that is pivotally coupled to the main body, wherein the locking door is configured to be moved between an open position and a closed position, wherein the first webbing is adjustable in relation to the web-adjustment clamp when the locking door is in the open position, and wherein the first webbing is locked in place when the locking door is in the closed position, and
    wherein the fold channel connects with the first lateral channel, and wherein the exit channel is canted in relation to one or more of the first lateral channel, the second lateral channel, and the fold channel.

13. The web-adjustment system of claim 12, further comprising a second webbing, wherein the second webbing passes through and is retained within the fold channel.

14. The web-adjustment system of claim 12, wherein the locking door comprises a locking ledge that is configured to engage a portion of the first webbing when the locking door is in the closed position, wherein the locking ledge of the locking door has a longitudinal axis that is parallel to the portion of the first webbing that extends between the first lateral channel and the second lateral channel.

15. The web-adjustment system of claim 12, wherein the first lateral channel is defined between a first lateral beam and a surface plane of a base of the main body, and wherein the second lateral channel is defined between a second lateral beam and the surface plane of the base, wherein the fold channel is formed through the base of the main body underneath the first lateral beam, wherein the fold channel is axially aligned with the first lateral channel and the second lateral channel.

16. The web-adjustment system of claim 12, wherein the main body comprises an outboard beam that is coplanar with a base, and wherein the fold channel is bounded by a first interior edge of the base and a second interior edge of the outboard beam.

17. The web-adjustment system of claim 12, wherein one of the first lateral channel or the second lateral channel provides an entry slot that is configured to receive a free end of the first webbing, and wherein the other of the first lateral channel or the second lateral channel provides a retaining slot.

18. The web-adjustment system of claim 17, wherein a free end of the first webbing is configured to be folded through the fold channel while a portion of the first webbing is retained between the first lateral channel and the second lateral channel.

19. The web-adjustment system of claim 12, wherein a portion of the first webbing is configured to be retained between the first lateral channel and the second lateral channel.

20. A web-adjustment clamp, comprising:
a main body including a first lateral channel, a second lateral channel, a fold channel, and an exit channel, the first lateral channel, the second lateral channel, the fold channel, and the exit channel being configured to accept, have passed through, and retain a first webbing; and
a locking door that is pivotally coupled to the main body, wherein the locking door is configured to be moved between an open position and a closed position, wherein the first webbing is adjustable in relation to the web-adjustment clamp when the locking door is in the open position, and wherein the first webbing is locked in place when the locking door is in the closed position,
wherein a longitudinal axis of the exit channel is angled in relation to a longitudinal axis of the fold channel, and wherein the longitudinal axis of the exit channel is non-parallel with the longitudinal axis of the fold channel.

21. The web-adjustment clamp of claim 20, wherein the fold channel is further configured to accept, have passed through, and retain a second webbing.

22. The web-adjustment system of claim 20, wherein the first lateral channel is defined between a first lateral beam and a surface plane of a base of the main body, and wherein the second lateral channel is defined between a second lateral beam and the surface plane of the base, wherein the fold channel is formed through the base of the main body underneath the first lateral beam, wherein the fold channel is axially aligned with the first lateral channel and the second lateral channel.

* * * * *